US008719922B2

(12) United States Patent
Ooi

(10) Patent No.: US 8,719,922 B2
(45) Date of Patent: May 6, 2014

(54) SENSORY ASSOCIATION PASSCODE

(75) Inventor: Chen Ling Ooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/549,333

(22) Filed: Jul. 13, 2012

(65) Prior Publication Data

US 2014/0020087 A1 Jan. 16, 2014

(51) Int. Cl.
*G06F 12/14* (2006.01)

(52) U.S. Cl.
USPC .............................................. 726/19; 725/28

(58) Field of Classification Search
None
See application file for complete search history.

(56) References Cited

U.S. PATENT DOCUMENTS

| 7,593,000 B1 * | 9/2009 | Chin .............................. 345/156 |
| 7,904,572 B2 * | 3/2011 | Tadokoro et al. ............. 709/229 |
| 2005/0003799 A1 * | 1/2005 | Kang .............................. 455/411 |
| 2008/0091425 A1 * | 4/2008 | Kane .............................. 704/246 |
| 2009/0133051 A1 * | 5/2009 | Hildreth .......................... 725/28 |
| 2009/0319274 A1 * | 12/2009 | Gross ............................. 704/260 |
| 2010/0083353 A1 * | 4/2010 | Wang ................................. 726/5 |
| 2011/0187497 A1 * | 8/2011 | Chin ............................. 340/5.54 |
| 2012/0272313 A1 * | 10/2012 | Ferren ............................. 726/19 |

* cited by examiner

*Primary Examiner* — Philip Chea
*Assistant Examiner* — Khoi Le
(74) *Attorney, Agent, or Firm* — Blakely, Sokoloff, Taylor & Zafman LLP

(57) ABSTRACT

A device is secured against unauthorized use with a passcode based on a sensory association of a visual item with one or both of a sound clip and a tactile pattern. The sensory association passcode is encoded from one or more frames containing a user-selected combination of the visual item with the sound clip and/or the tactile pattern. The sensory association passcode can be further encoded with a sequence that indicates an order of the one or more frames of the passcode. Users can retrieve a portion of the sensory association passcode to facilitate recall of a forgotten passcode. The user-selected combination of the visual item with the sound clip and/or the tactile pattern facilitates easier recall of a passcode than might be possible with conventional passcode techniques.

21 Claims, 7 Drawing Sheets

SENSORY ASSOCIATION PASSCODE

TECHNICAL FIELD

The technical field relates generally to securing electronic devices against unauthorized use.

BACKGROUND ART

As electronic devices, such as cell phones, laptops, tablets and electronic readers become more popular, and as users take their devices with them into public places, the need to secure the devices against unauthorized use becomes more acute. Typically, devices are secured through some sort of device lock that requires the user to remember and enter via the device's user interface a secret security code, such as a password, personal identification number or passcode that functions as a key to unlock the device. This allows the user to be authenticated as an authorized user of the device before it is unlocked.

The reliability and usefulness of the device lock depends on a number of factors, such as the strength of the secret security code and the user's ability to remember it. If the device lock is too cumbersome or the secret security code is difficult to remember, users might not bother to lock their device. Conversely, if the device lock is too easy or the secret security code is easy to remember, the device lock might be easily compromised. Either way, the device is vulnerable to unauthorized use. Moreover, unlocking the device in a public space renders the secret security code vulnerable to observation attacks.

BRIEF DESCRIPTION OF THE DRAWINGS

The present invention is illustrated by way of example and not limitation in the figures of the accompanying drawings, in which like references indicate similar elements and in which.

Figure 1:
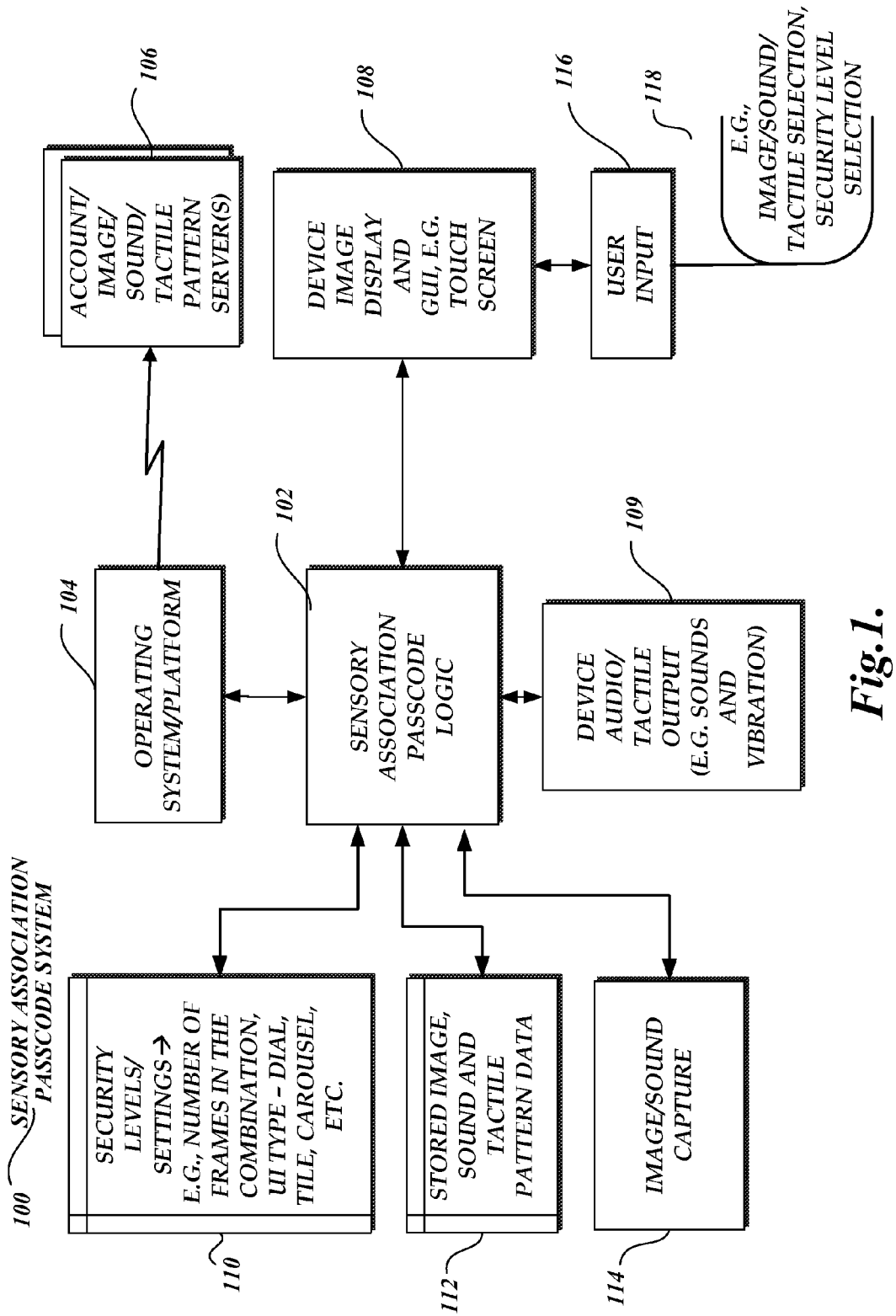
FIG. 1 is a block diagram illustrating one embodiment of a system for a sensory association passcode.

Other features of the present invention will be apparent from the accompanying drawings and from the detailed description that follows.

DESCRIPTION OF THE EMBODIMENTS

Methods, machine-readable tangible storage media, and data processing systems are described for securing a device with a sensory association passcode. In the description that follows a computing device such as a laptop computer, notebook computer, and electronic tablet or reading device, camera, cell phone, smart phone or any other type of computing device or computing system having or being accessed via an interactive graphical user interface, such as a touch screen interface, are collectively referred to as a device.

Numerous specific details are set forth to provide a thorough explanation of embodiments of the methods, media and systems for securing a device with a sensory association passcode. It will be apparent, however, to one skilled in the art, that an embodiment can be practiced without one or more of these specific details. In other instances, well-known components, structures, and techniques have not been shown in detail so as to not obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g. circuitry, dedicated logic, etc.), software (such as is run on a general-purpose computer system or a dedicated machine or device), or a combination of both. Although the processes are described below in terms of some sequential operations, it should be appreciated that some of the operations described can be performed in a different order. Moreover, some operations can be performed in parallel rather than sequentially.

A device having an audiovisual user interface and tactile capability, such as the ability to generate a device vibration pattern or to modify the device's touch screen interface to generate a touchable raised pattern, is secured against unauthorized use with a sensory association passcode in accordance with embodiments of the invention as described herein. In one embodiment, the sensory association passcode is composed of one or more descriptors that identify a combination of images, sounds and/or tactile patterns used to lock the device.

For ease of reference in the following paragraphs the description will often refer to a single combination contained in a single frame. However, it should be understood that multiple combinations contained in multiple frames are typically used without departing from the scope of the claimed embodiments of the invention that follow.

The frame combinations that form the sensory association passcode may vary as long as they are capable of being reproduced on the device with the audiovisual user interface and/or the device's tactile capability. By memorizing the images, sounds and/or tactile patterns contained in the frame combinations used to create the sensory association passcode, the user can unlock the device by indicating that same frame combinations again via the interactive audiovisual display. Since the images, sounds and/or tactile patterns are memorized in combination with one another, remembering any one of them may allow for easier recall of the remaining combination than might be possible with conventional passcode techniques, such as a sequence of letters, numbers and/or symbols. In addition, the use of a sensory association passcode can facilitate securing a device against unauthorized access for users needing accessibility accommodations to use the device, such as those users for whom conventional keyboard and pointer-based user interfaces pose a barrier to access. The use of non-visual components in the sensory association passcode can also protect against observational attacks in public places.

In a typical embodiment, the images, sounds and tactile patterns used to lock the device are pre-defined. For example, in one embodiment, the user may select the image from among images already stored on the device or downloaded from an image server. In one embodiment, the user may capture an image of their own with a camera feature on the device, allowing for a more personalized way to secure their device against unauthorized use. The image can then be stored on the device for subsequent use with the device lock. In one embodiment, the image may instead be simply a character of text, number or symbol with which the sounds and tactile patterns may be associated.

As with the images, in one embodiment, the user may select the sound from among audio clips already stored on the device or downloaded from an audio clip server. In one embodiment, the user may capture a sound of their own with a sound recording feature on the device, allowing for a more personalized way to secure their device against unauthorized use. The audio file can then be stored on the device or on a server for subsequent use with the device lock.

In one embodiment, the user may select the tactile pattern from among vibration patterns that the device is capable of generating, such as a short Bzz Bzz, a long Buzz, Buzz, or a mix of short and long BzBuzz, and the like. Similar selections may be performed for devices with the ability to generate other tactile patterns, such as touchable patterns generated on an interactive touch area of the device.

Once the variety of images, sounds and tactile patterns that can be used to lock the device is determined, the device prompts the user to create a sensory association passcode by indicating which combination of images, sounds and tactile patterns to use via the device's user interface, such as via a touch screen display. In a typical embodiment, the user-indicated combination is then encoded into descriptors to form the sensory association passcode. The encoded sensory association passcode is then stored on the device in preparation for subsequent unlocking.

In a typical embodiment, the complexity of the frame combination(s) that the user can select is variable, depending on the user's preference and the desired strength of the passcode. For example, to create a stronger sensory association passcode, the user will be prompted to specify a greater number of frames of combinations, where each frame represents one combination of image, sound and/or tactile pattern, and all of the frames taken together represent the complete sensory association passcode. Thus, to create a sensory association passcode that is simpler but likely to be weaker, the user can indicate a smaller number of frames. As an example, a more complex passcode might be composed of five frame combinations, whereas a less complex passcode might be composed of only three frame combinations.

In one embodiment, another level of complexity of the combination that the user can select is the number of choices of images, sounds or tactile patterns from which the user can create the frame combination(s) that comprise the sensory association passcode. For example, a high level of complexity allows for a wider selection of images, sounds and tactile patterns from which the user can create his or her sensory association passcode. A low level of complexity may restrict the user to a more limited selection of images, sounds and/or tactile patterns.

In one embodiment, the device optionally tracks the order in which the frames are presented via the audiovisual user interface during creation of the sensory association passcode. In that case, the sensory association passcode is composed of not only the descriptors encoding the user-selected composition of each frame, but also the sequence of the frames, such as the order in which the frames appear when prompted to create the sensory association passcode, or even an arbitrary order that is explicitly indicated by the user. Upon validation, the user must not only select the correct frame combinations, but must also indicate the correct order of the frame combinations to unlock the device.

Once the sensory association passcode has been created to the user's satisfaction, the device lock can be activated for use with the sensory association passcode. In one embodiment, in response to an attempted use of a locked device, a frame interface to unlock the device is presented to the user on the audiovisual user interface and the user is prompted to unlock the device by entering the sensory association passcode, i.e. by indicating the same frame combinations of images, sounds and tactile patterns that the user indicated when initially creating the sensory association passcode. In one embodiment, the frame interface used to unlock the device may be presented as a carousel of frames that can be rotated through and selected. Other frame interfaces may be used as well, such as a tiled interface, as long as the user can indicate a selection of a frame from among a choice of frames. If the sequence of the user-selected locations is maintained as part of the sensory association passcode, then to successfully unlock the device the frame sequence must also be indicated in the same order as was indicated when the user initially created the sensory association passcode.

In one embodiment, the complexity of the sensory association passcode is governed by a security level. In a typical embodiment, multiple security levels accommodate varying user preferences and/or device constraints in securing the device against unauthorized access. For example, in one embodiment there could be three levels of security, low, medium and high, each specifying the number of frames comprising the passcode, the number of images per frame from which to select the image that is part of the passcode, whether and how many sounds are to be included as part of the passcode, and whether and how many tactile patterns are to be included as well. A low security level, for example, might specify a small number of frames with only tactile patterns included whereas a high security level might specify a large number frames, with both sounds and tactile patterns included. In addition, the high security level might specify a wider choice of images, sounds and tactile patterns from which each frame is composed than a low security level. In one embodiment, the security levels might specify other aspects to incorporate into the sensory association passcode, such as the sequence of the frames. For example, the sequence of the frames might be the order in which the frames must be positioned on the display or the order in which they are selected from the display in order to match the stored sensory association passcode.

In one embodiment, if the user fails to accurately indicate the content of one or more frame combinations that the user specified when initially creating the sensory association passcode, then the process of validating the passcode will fail and the device will remain locked until the content of all of the frame combinations are correctly indicated in accordance with the previously stored sensory association passcode.

In one embodiment, the sensory association passcode can be recovered if the user cannot remember it through a retrieval process. The retrieval process can be used to cause the device to display an audiovisual display or playback of all or a portion of the sensory passcode, such as all or a portion of the images, sounds and tactile patterns contained in the frame combinations that form the sensory association passcode. In one embodiment, the device might playback just the sounds or tactile patterns which may be sufficient to aid the user in recalling their passcode. Of course, the retrieval process itself would be governed by an alternative authentication process to prevent unauthorized access to the sensory association passcode. In one embodiment, for example, the retrieval process might include information describing all or a portion of the sensory association passcode as an attachment emailed to the user via the user's email address after the user completes the alternative authentication process.

FIG. 1 is a block diagram illustrating one embodiment of a system for a sensory association passcode to protect a device against unauthorized use according to one embodiment described herein. A sensory association passcode system 100 includes a device configured with sensory association passcode logic 102 operating in conjunction with an operating system/platform 104 and an interactive device display and graphical user interface 108 for displaying an image to the user, generating audio or tactile output to the user 109, and receiving the user input 116 as needed to secure the system against unauthorized use. The user input 116 typically includes not only the selection of which image to use and what security level to use, but also, via an audiovisual user interface of the image, the indication of the sounds and tactile patterns to use as described in further detail below.

In one embodiment, the user input 116/118 might also include user input for capturing an image or sound with the device itself 114, or selecting and acquiring an image or sound from an image/sound server 106. In one embodiment, the system 100 is connected or connectable to an account/image/sound and tactile pattern server(s) 106 that further operate in conjunction with the sensory association passcode logic 102 to select and acquire an image, sound or tactile pattern with which a sensory association passcode can be employed, as well as to facilitate processes to create, validate and/or retrieve the sensory association passcode. The system includes a stored image, sound and tactile pattern data 112 as well as stored security levels/settings 110, such as the number of frame combinations comprising the sensory association passcode, the type of user interface style to use when presenting the frame combinations to the user during creation and or validation of the sensory association passcode, e.g. a dial display, a tile display or a carousel display, etc.

The stored security levels/settings 110 include the descriptors that identify the locations of stored images, sounds, and tactile pattern data that the user specified during the creation of the sensory association passcode. In one embodiment, the security levels/settings 110 optionally include the security levels that specify the number of frame combinations that form the sensory association passcode to successfully gain access to a locked device. For example, the security/levels settings 110 can include the low, medium and high levels described above with reference to not only the number of frame combinations comprising the sensory association passcode, but also how wide the selection of images, sounds and tactile patterns from which the sensory association passcode is composed.

In one embodiment, the security levels/settings 110 optionally include a passcode sequence that represents a validation order in which the user must position or select the frame combinations that forms the sensory association passcode on the user interface in order to successfully gain access to a locked device. In a typical embodiment the validation order is the same as the order captured during the process to create the sensory association passcode. For example, in one embodiment, the order in which the user specified each frame is tracked during the creation of the sensory association passcode and stored as the passcode sequence/validation order.

In one embodiment, the user can alter the passcode sequence subsequent to the completion of the process of creating of the sensory association passcode. For example, the user is presented with the frame combinations as they appear during the creation of the passcode with a prompt to alter the order. In that case, the validation order of the frame combinations that form the sensory association passcode to gain access to a locked device is not the same as the tracked order. Instead, the validation order is the order represented in the altered passcode sequence specified by the user subsequent to the creation of the sensory association passcode.

In one embodiment, the system for a sensory association passcode 100 may also include an image or sound capture component 114 that is incorporated into the device or in communication with the device such that the user may capture and store the user's own image or sound file for use when creating, validating and retrieving a sensory association passcode.

Figure 2:
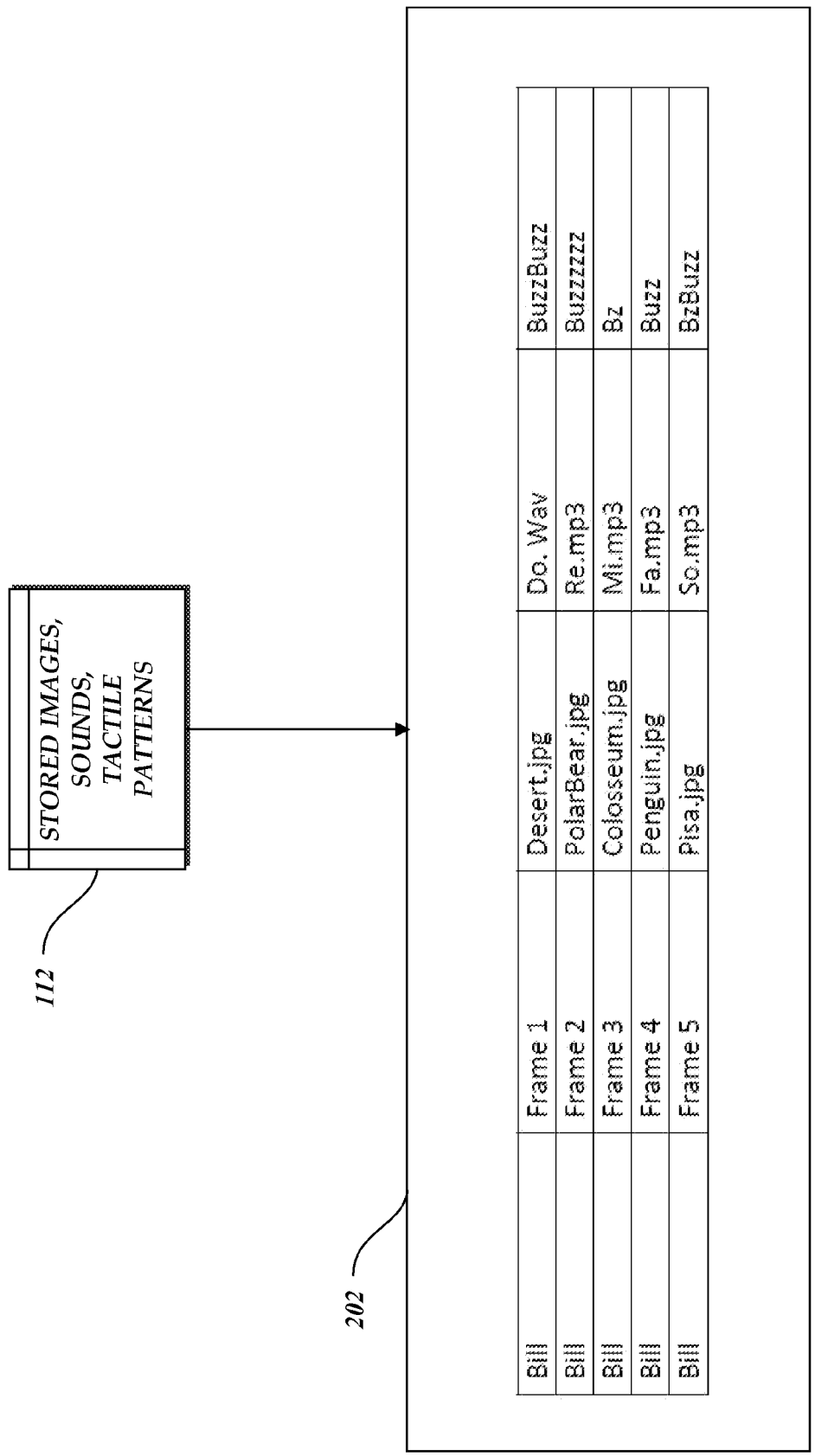
FIG. 2 illustrates an example of stored data that can be used in accordance with one embodiment of a system for a sensory association passcode.

FIG. 2 illustrates an example of stored image sound and tactile pattern data 202 associated with the stored image 112 (FIG. 1) that can be used in accordance with an embodiment of a system 100 (FIG. 1) for a sensory association passcode. The stored image data 202 can include a table containing the name of the user, the frame identifier/sequence, and descriptors that identify which image, sound and tactile pattern is used to compose the identified frame. Thus, in the illustrated example, there is for the user Bill, five different frames of data stored, with Frame 1 composed of a desert image, a sound file Do.wav, and, for the tactile pattern, a BuzzBuzz vibration pattern. The other four frames for Bill are similarly specified.

In a typical embodiment, the storage location of the image, sound and tactile pattern data is local and resides on the device itself. Thus, for example, the "polarbear.jpg" or "desert.jpg" files can be stored in memory in the device. However, the storage location of the image, sound or tactile pattern data could also be configured to be remote, in which case the data could reside on an image/sound server accessible to the device for the limited purpose of authorizing the user to access the other features of the device.

Figure 3:
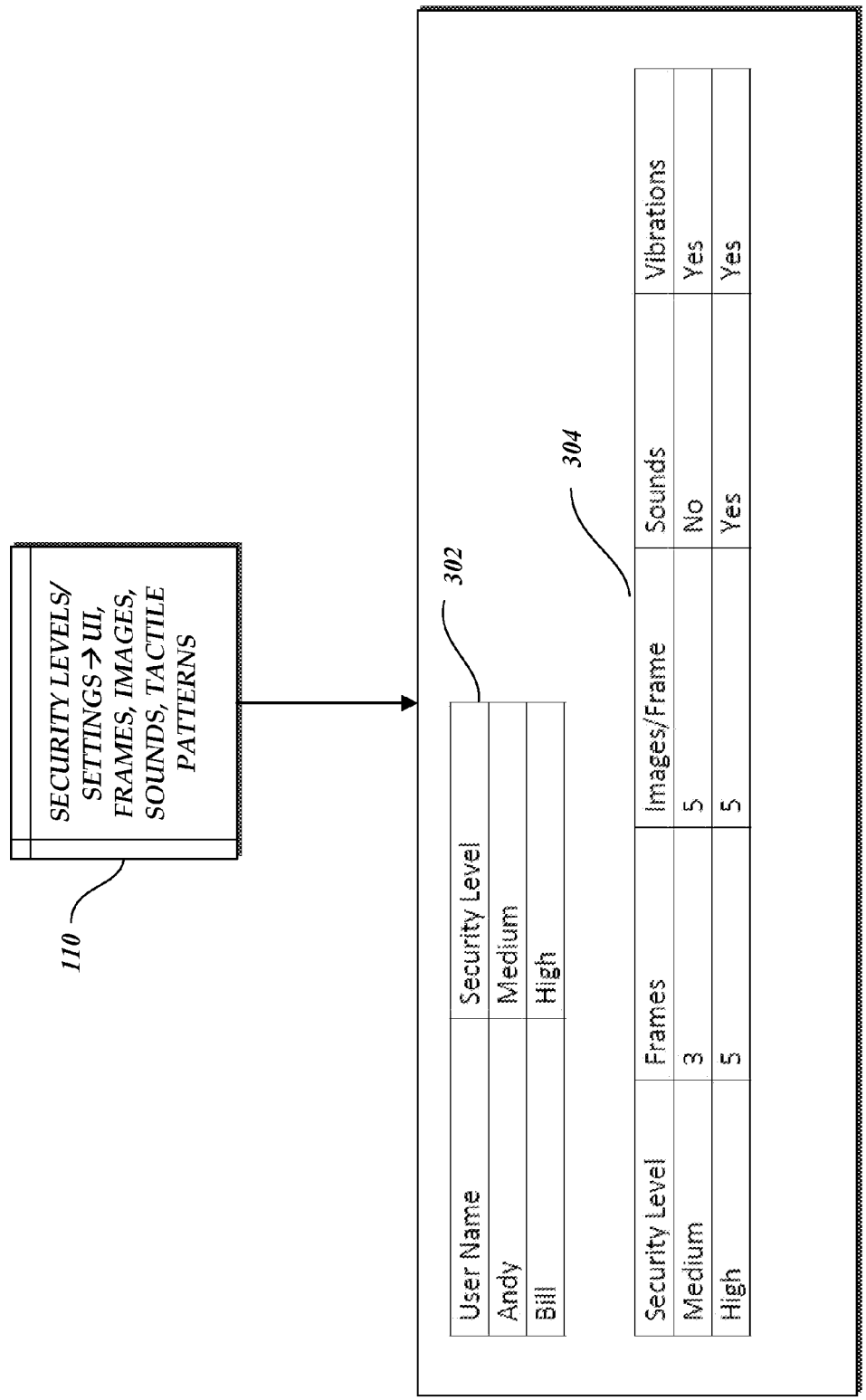
FIG. 3 illustrates an example of security settings that can be used in accordance with one embodiment of a system for a sensory association passcode.

FIG. 3 illustrates an example of security settings 110 (FIG. 1) that can be used in accordance with one embodiment of a system for a sensory association passcode. As shown, a user security setting table 302 is stored in memory in the device, and contains a User_ID 304 that uniquely identifies a particular user of the device (in case there are more than one user of the device), and that user's security level setting, the Security_Setting_ID 306. Thus, in the illustrated example, "Andy" has specified a medium level of security to use when he unlocks a device, and "Bill" has specified a high level of security to use when he unlocks the device. It should be noted that the security settings could be dictated in advance of the user's creation of the sensory association passcode by, for example, the device manufacturer or the user's service provider (as might be the case if the device is used with a service such as a mobile communication service). The security settings may also be dictated, at least in part, by the constraints imposed by the device's audiovisual user interface and tactile pattern capabilities. For example, a larger image and/or larger display area, or greater memory capacity might allow for a larger number of frames, whereas security levels when using a smaller image/display area or smaller memory might be more limited.

Figure 4:
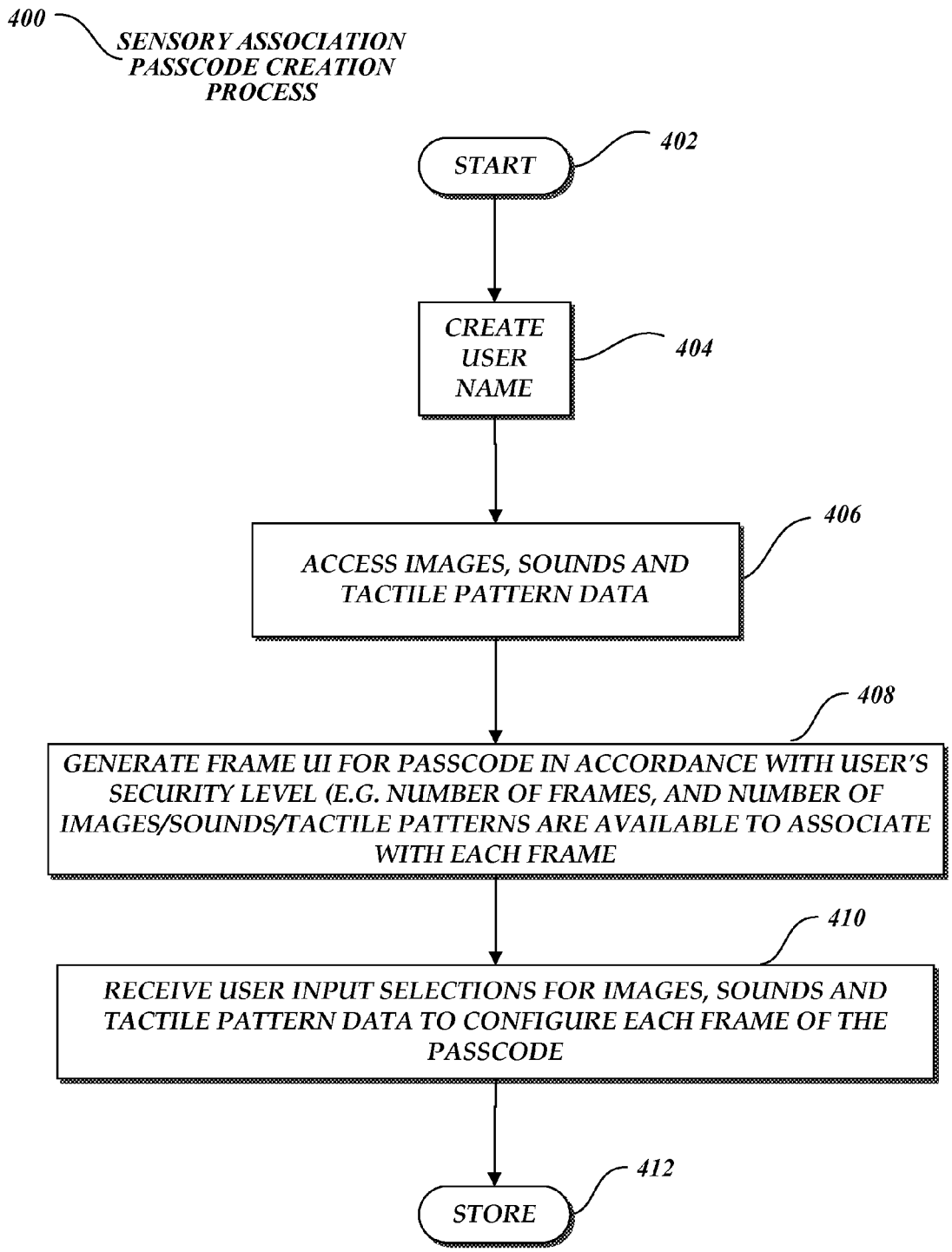
FIGS. 4-6 are flow diagrams illustrating embodiments of processes for creating, validating and retrieving a sensory association passcode in accordance with embodiments of a system for a sensory association passcode.
Figure 5:
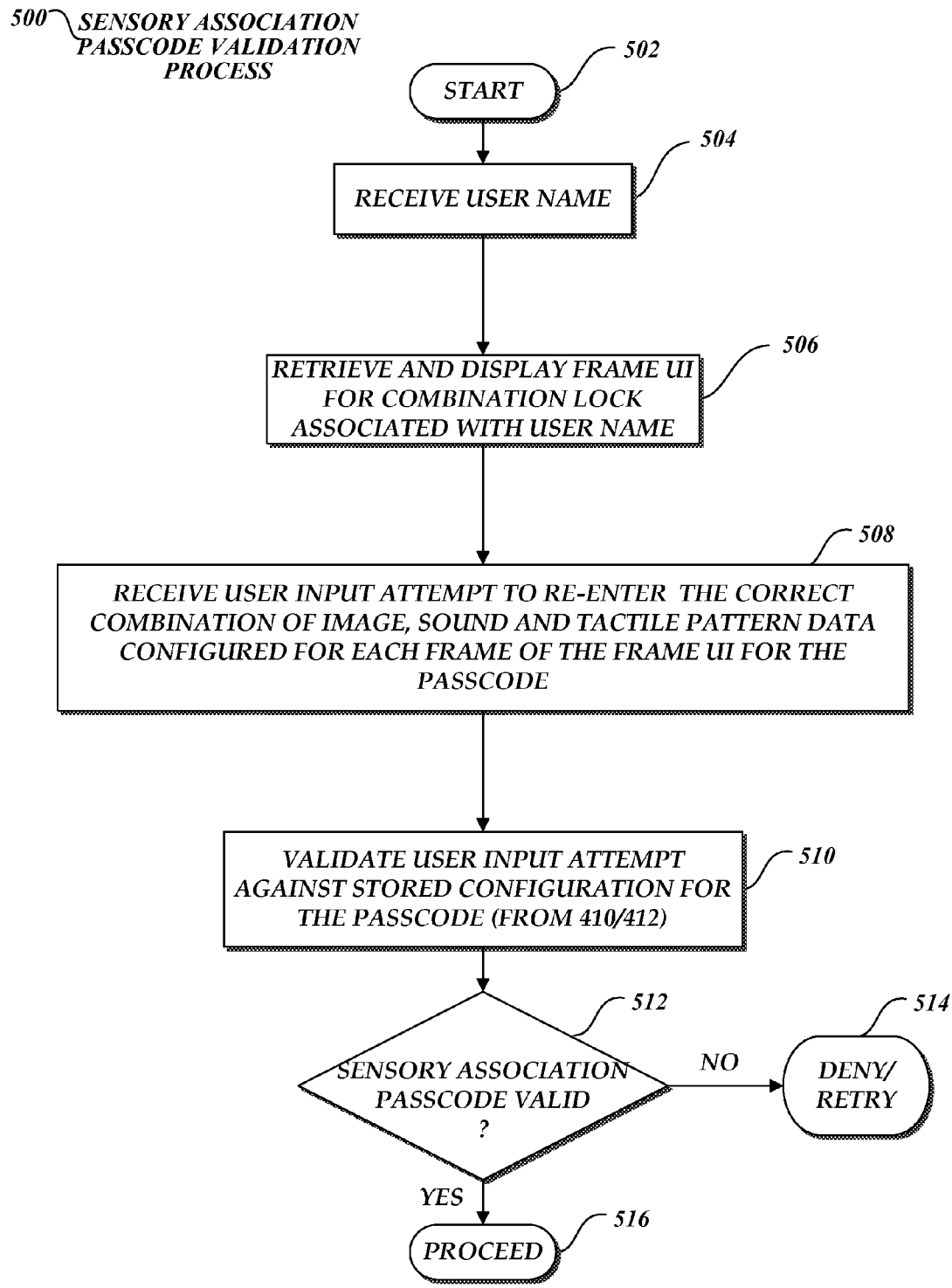
Figure 6:
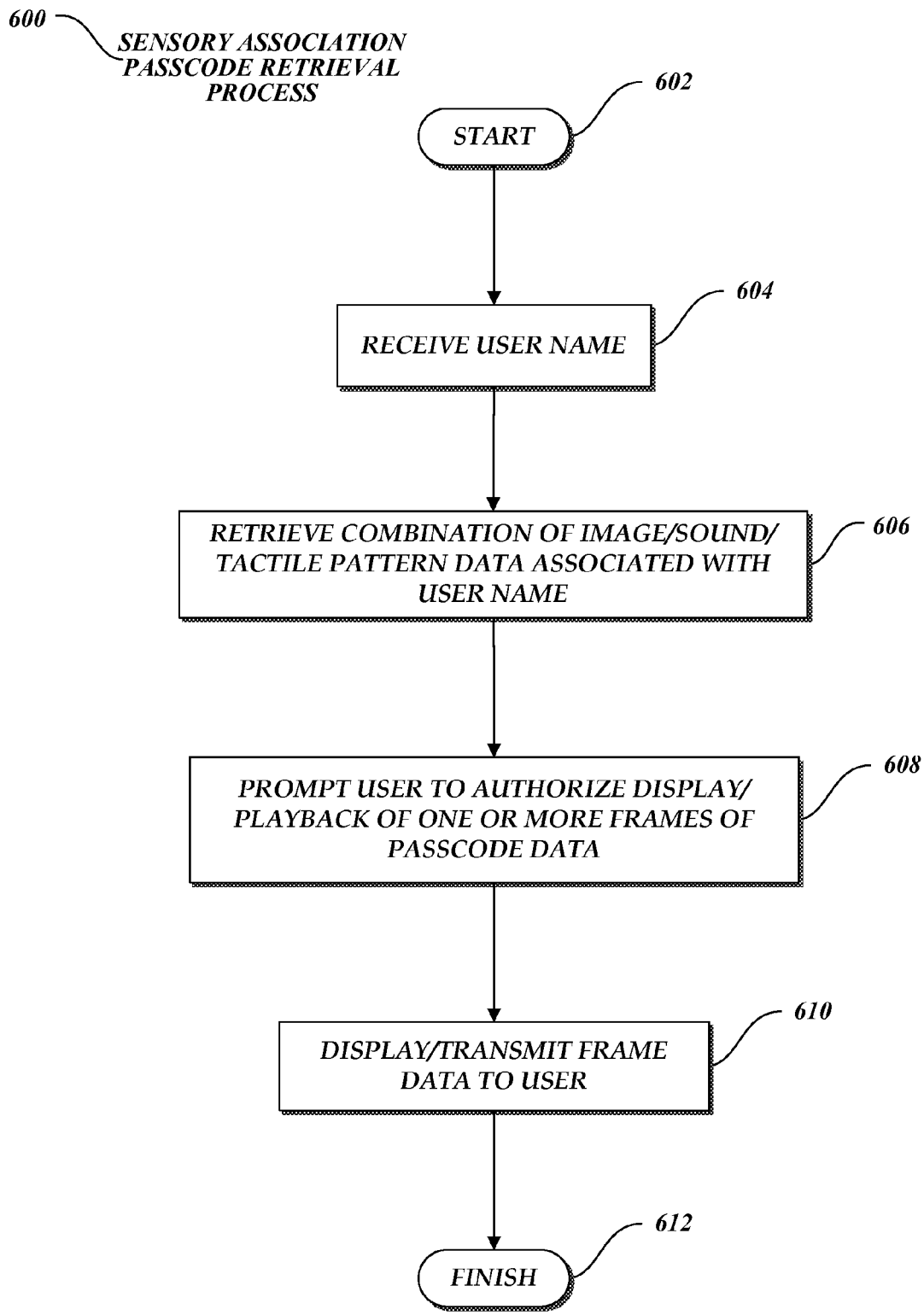

FIGS. 4-6 are flow diagrams illustrating embodiments of processes for creating, validating and retrieving a sensory association passcode in accordance with embodiments of a system for a sensory association passcode. Starting with FIG. 4, a sensory association passcode creation process 400 begins 402 with the device at process 404 receiving a newly created user name, the user name uniquely identifying a user of the device that is to be secured against unauthorized use.

In one embodiment, at process block 406, the device accesses the images, sounds and tactile pattern data to be used for creating the sensory association passcode. The images/sounds/tactile patterns are typically selected from those already stored on the device, but could also be selected from an image/sound/tactile pattern data server accessible to the device. In one embodiment, the images or sounds are captured by a camera or audio recording feature of the device, in which case it is stored for subsequent use. It should be noted that, although the embodiments of the invention are described with reference to sounds and image data, the data comprising the sensory association passcode could also be video data of short clips of moving images and sound, depending on the constraints of the device.

At process block 408, the device generates the frame user interface for creating the sensory association passcode in accordance with the user's security level. For example, if the user's security level was high then as many as five or seven frame user interface may be generated. The choice of images, sounds and tactile pattern data from which the user may compose the frames of the sensory association passcode are also determined in process block 408. At process block 410, the process 400 receives user input indicating the user-selected images, sounds and tactile patterns that form the sensory association passcode. The user input can be received in a number of ways, such as via a finger or stylus touch on an interactive touch screen display of the frame combination, a mouse click in a graphical user interface display of the frame combination, or shaking the device to manipulate the display and selections of the user interface. Of course, other modes of receiving the user input can be employed without departing from the scope of the claimed embodiments that follow. For example, a device could be adapted to receive eye tracking input from a user unable to use a more conventional user interface.

In a typical embodiment, the content of each frame combination is encoded by the device into descriptors that identify the location of the images, sounds and tactile patterns as well as the sequence of the frames. Thus, for example, if the user security settings specify that the sequence is part of the sensory association passcode, then the user may specify the sequence of the frames in the desired order.

Turning to FIG. 5, a sensory association passcode validation process 500 starts 502 at process block 504, in which a user is prompted to enter their name or other identifying information that can be used to retrieve the corresponding security setting information stored for the user. At process block 506, the user is then prompted to enter the sensory association passcode via an audiovisual rendering of the images, sounds and tactile pattern data with which the sensory association passcode was created. Specifically, at process block 508, the user is prompted to indicate, via the audiovisual user interface, validation selections of the image/sound/tactile pattern combinations for each frame that was used to create the sensory association passcode. In a typical embodiment, the order in which the user indicates the validation locations is encoded into a validation sequence.

The process 500 continues at process block 510, in which the entered validation frame combination data and sequence are validated against the corresponding sensory passcode data stored in the security settings. At decision block 512, if the entered validation frame combination data and validation sequence match the stored descriptors and sequence information comprising the sensory association passcode, then the device is unlocked and control of the device returns to the user at termination 516. However, if the validation frame combination data and validation sequence do not match the stored descriptors and sequence information in the corresponding security settings, then the device remains locked at termination 514. In a typical embodiment, the user is able to retry the validation process 500, in which case control returns to the beginning at 502. After failing one or more attempts to correctly indicate their sensory association passcode using the validation process 500, users can be prompted to retrieve a lost or forgotten passcode as described next with reference to FIG. 6.

Turning to FIG. 6, a sensory association passcode retrieval process 600 starts 602 at process block 604, in which a user is again prompted to enter their name or other identifying information that can be used at process block 606 to retrieve the corresponding security setting information stored for the user, including the stored image/sound/tactile pattern data and sequence settings. After successfully completing a conventional alternative authentication process, such as by prompting the user to enter birth place, mother's maiden name, school name, pet name, etc., the process 600 continues at process block 608, in which all or a portion of the stored images, sounds and tactile pattern data with which the sensory association passcode was created is prepared for describing to the user to aid them in entering the correct passcode. The retrieval process 600 continues at process 610, in which a portion of the sensory association passcode is briefly displayed/reproduced for the user on the device that they are trying to unlock, or more typically is transmitted to the user via a separate transmission, such as via an attachment to an email sent to an email address that is stored for the user or via a descriptive text message. The user's memory having been refreshed by the descriptive information about the retrieved sensory association passcode displayed on the device, the process 600 concludes at termination block 612. The user again attempts to unlock their device by validating their sensory association passcode using the validation process 500.

Figure 7:
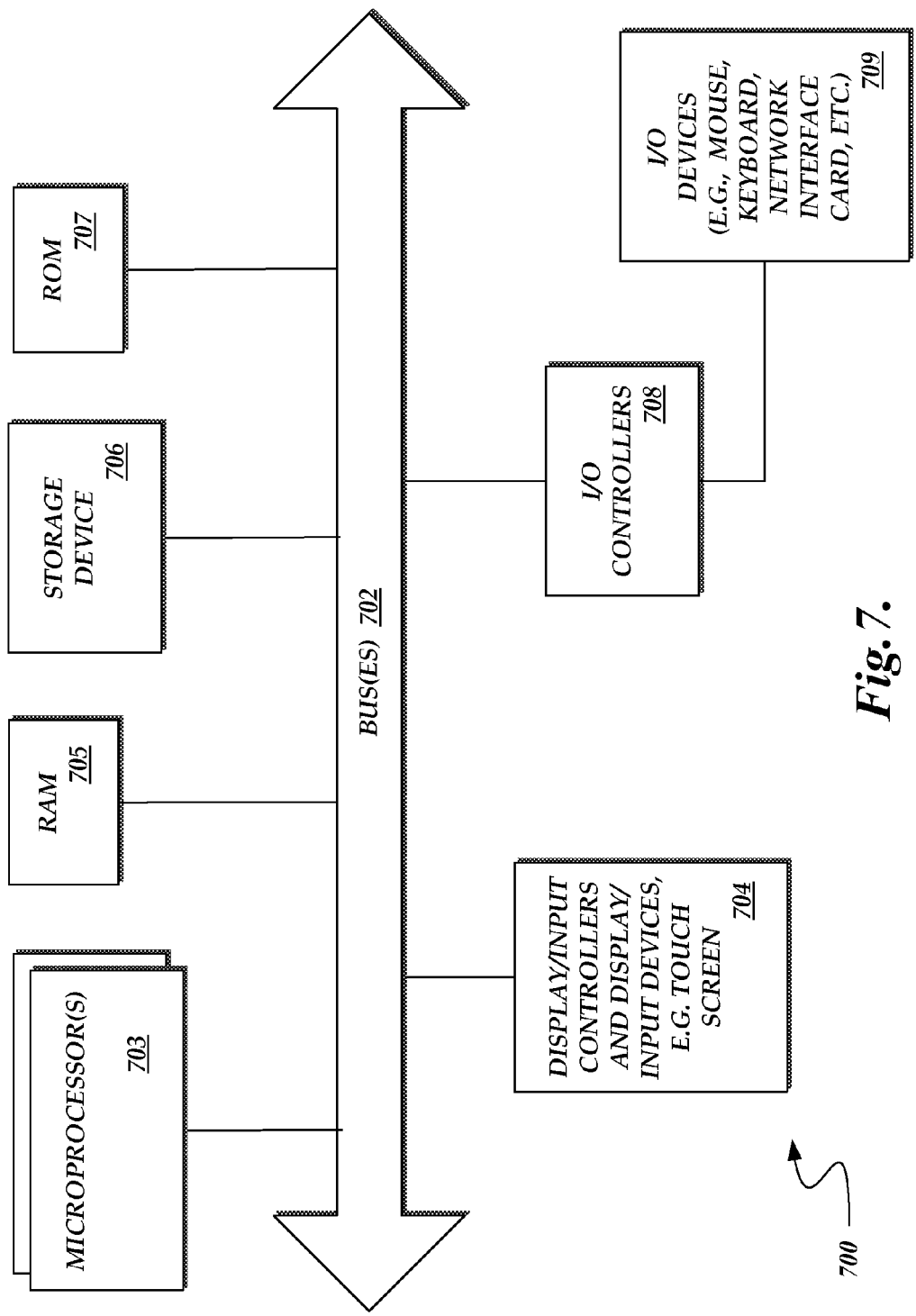
FIG. 7 illustrates an example of a typical computer system which can be used in conjunction with the embodiments described herein.

FIG. 7 illustrates an example of a typical computer system which can be used in conjunction with the embodiments described herein. Note that while FIG. 7 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 7 could also be used with the present invention. The data processing system of FIG. 7 can be any type of computing device, such as a mobile or stationary computing and/or communication device including but not limited to a cell phone, smart phone, tablet computer, laptop computer, electronic book reader, desktop computer, digital camera, etc. As shown in FIG. 7, the data processing system 700 includes one or more buses 702 which serve to interconnect the various components of the system. One or more processors 703 are coupled to the one or more buses 702 as is known in the art. Memory 705 can be DRAM or non-volatile RAM or can be flash memory or other types of memory. This memory is coupled to the one or more buses 702 using techniques known in the art. The data processing system 700 can also include non-volatile memory 707 which can be a hard disk drive or a flash memory or a magnetic optical drive or magnetic memory or an optical drive or other types of memory systems which maintain data even after power is removed from the system. The non-volatile memory 707 and the memory 705 are both coupled to the one or more buses 702 using known interfaces and connection techniques. A display controller 704 is coupled to the one or more buses 702 in order to receive display data to be displayed on a display device 704 which can display any one of the user interface features or embodiments described herein. The display device 704 can include an integrated touch input to provide a touch screen. The data processing system 700 can also include one or more input/output (I/O) controllers 708 which provide interfaces for one or more I/O devices, such as one or more mice, touch screens, touch pads, joysticks, and other input devices including those known in the art and output devices (e.g. speakers). The input/output devices 709 are coupled through one or more I/O controllers 708 as is known in the art. While FIG. 7 shows that the non-volatile memory 707 and the memory 705 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 702 may include one or more bridges or controllers or adapters to interconnect between various buses. In one embodiment, the I/O controller 708 includes a USB adapter for controlling USB peripherals and can control an Ethernet port or a wireless transceiver or combination of wireless transceivers. It will be apparent from this description that aspects of the present invention could be embodied, at least in part, in software. That is, the techniques and methods described herein could be carried out in a data processing system in response to its processor executing a sequence of instructions contained in a tangible, non-transitory memory such as the memory 705 or the non-volatile memory 707 or a combination of such memories, and each of these memories is a form of a machine readable, tangible storage medium. In various embodiments, hardwired circuitry could be used in combination with software instructions to implement the present invention. Thus the techniques are not limited to any specific combination of hardware circuitry and software or to any particular source for the instructions executed by the data processing system.

All or a portion of the described embodiments can be implemented with logic circuitry such as a dedicated logic circuit or with a microcontroller or other form of processing core that executes program code instructions. Thus processing taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages could be used to implement the teachings of the invention as described herein.

In the foregoing specification, the invention has been described with reference to specific exemplary embodiments. It will be evident that various modifications could be made to the described embodiments without departing from the broader spirit and scope of the invention as set forth in the following claims. The specification and drawings are, accordingly, to be regarded in an illustrative sense rather than a restrictive sense.

What is claimed is:

1. A method for securing a device against unauthorized use, the method comprising:
   storing a sensory association passcode on a device, the sensory association passcode having encoded therein frame combinations, each frame combination containing a visual item in combination with one or both of a sound clip and a tactile pattern from which a user is to create a sensory association between the visual item, sound clip and tactile pattern to aid in the user's later recall of the frame combination, the content of each frame combination having been user-selected via a user interface;
   responsive to a request to unlock a device, displaying a selection of frame on the user interface, the selection including matching frame combinations that match the frame encoded in the sensory association passcode and non-matching frame that do not match the frame encoded in the sensory association passcode;
   responsive to a selection of one of the frame displayed on the user interface, displaying the visual item along with at least one of sounding the sound clip and generating the tactile pattern, the visual item, sound clip and tactile pattern being contained in the selected one of the frame combinations;
   receiving a user input via the user interface indicating which of the selection of frame to use to unlock the device;
   comparing the user-indicated frame combination to the frame encoded in the sensory association passcode; and
   unlocking the device when the user-indicated frame combination is one of the matching frame combinations.

2. The method of claim 1, the sensory association passcode having further encoded therein a sequence of the frame combinations, the user input indicating the sequence of frame to use to unlock the device, and unlocking the device when the user indicated sequence matches the sequence of frame encoded in the passcode.

3. The method of claim 1, further comprising:
   prompting the user to retrieve a portion of the sensory association passcode when the user-indicated are non-matching frame combinations, the portion including any one or more of the sound clip and tactile patterns contained in each frame combination;
   relaying the portion of the sensory association passcode to the user after a successful alternative authentication, the portion of the sensory association facilitating user recall of matching frame combinations.

4. The method of claim 1, the visual item including any one of an image, text or symbol capable of display on the user interface.

5. The method of claim 1, wherein the user interface used for displaying the selection of frame is any one of a carousel interface, a tile interface or a dial interface, wherein a user-selection of one of the frame combinations causes the content of the selected frame combination to be presented to the user, including displaying the visual item and any one or more of playing the sound clip and generating the tactile pattern with which the sensory association was created.

6. The method of claim 1, wherein the content of each frame combination is user-selected in accordance with a security level, the security level higher when presenting the user with a wider selection of any one or more of the visual items, sound clips and tactile patterns and the security level lower when presenting the user with a narrower selection.

7. The method of claim 1, wherein a number of frame combinations encoded in the sensory association passcode is governed by a security level, the security level higher for encoding the sensory association passcode using a greater number of frame and the security level lower for encoding the sensory association passcode using a smaller number of frame combinations.

8. A system for securing a device against unauthorized use, the system comprising:
   a storage medium for storing a sensory association passcode for securing the device against unauthorized use;
   an interactive interface for presenting and selecting visual items, sound clips or tactile patterns encoded in the sensory association passcode;
   a processor for performing processes in conjunction with the interactive interface to:
     encode the sensory association passcode from a set of frames, each frame containing a visual item in combination with one or both of a sound clip and a tactile pattern from which a user of the device is to form a sensory association between the visual item, sound clip and tactile pattern to aid in the user's later recall of each frame, the set of frames and content therein having been selected via the interactive interface;
     present validation frames on the interactive interface, the validation frames including matching frames whose content matches the frames encoded in the sensory association passcode and non-matching frames whose content does not match the frames encoded in the sensory association passcode;
     responsive to an interactive selection to preview one of the validation frames presented on the interactive interface, presenting the visual item along with at least one of sounding the sound clip and generating the tactile pattern, the visual item, sound clip and tactile pattern being contained in the selected one of the validation frames;
     receive user input via the interactive interface indicating which of the validation frames to use to unlock the device;
     compare the indicated validation frames to the frames encoded in the sensory association passcode; and
     unlock the device upon determining that the indicated validation frames are matching frames.

9. The system of claim 8, the sensory association passcode having further encoded therein a sequence of the set of frames, wherein the process to unlock the device includes determining that the user indicated validation frames in a same sequence as the sequence of the set of frames encoded in the sensory association passcode.

10. The system of claim 8, wherein the processor for performing processes in conjunction with the interactive interface is to further:

present a retrieval interface to facilitate retrieval of a portion of the sensory association passcode when the indicated validation frames are non-matching frames, the portion including any one or more of the sound clips and tactile patterns contained in each frame in the set of frames;

cause the portion to be transmitted to a user of the device after a successful alternative authentication, the portion facilitating user recall of matching frames.

11. The system of claim 8, the visual item including any one of an image, text or symbol capable of display via the interactive interface.

12. The system of claim 8, wherein the interactive interface is any one of a carousel interface, a tile interface or a dial interface, and further wherein to present a frame on the interactive interface is to cause the processor to display the visual item and generate any one or both of the sound and tactile pattern that form the sensory association between the visual item, sound clip and tactile pattern.

13. The system of claim 8, wherein the process to encode the sensory association passcode from the set of frames is performed in accordance with a security level setting in the system, the security level set higher to encode the sensory association passcode from a wider selection of any one or more of the visual items, sound clips and tactile patterns and the security level set lower to encode the sensory association passcode from a narrower selection.

14. The system of claim 8, wherein the process to encode the sensory association passcode from the set of frames is performed in accordance with a security level setting in the system, the security level set higher to encode the sensory association passcode using a greater number of frames and the security level set lower to encode the sensory association passcode using a fewer number of frames.

15. At least one computer readable non-transitory storage medium including instructions that, when executed on a machine, cause the machine to:

store a sensory association passcode on a device, the sensory association passcode having encoded therein frame combinations, each frame combination containing a visual item in combination with one or both of a sound clip and a tactile pattern from which a user is to create a sensory association between the visual item, sound clip and tactile pattern to aid in the user's later recall of the frame combination, the content of each frame combination having been user-selected via a user interface on the device;

responsive to a request to unlock the device, display a selection of frame on the user interface, the selection including matching frame combinations that match the frame encoded in the sensory association passcode and non-matching frame that do not match the frame encoded in the sensory association passcode;

responsive to a selection of one of the frame displayed on the user interface, displaying the visual item along with at least one of sounding the sound clip and generating the tactile pattern, the visual item, sound clip and tactile pattern being contained in the selected one of the frame combinations;

receive a user input via the user interface indicating which of the selection of frame to use to unlock the device;

compare the user-indicated frame combination to the frame encoded in the sensory association passcode; and unlock the device when the user-indicated frame combination is one of the matching matching frame combinations.

16. The at least one computer readable non-transitory storage medium of claim 15, wherein the instructions cause the machine to further:

encode the sensory association passcode with a sequence of frame combinations to use to unlock the device;

receive user input indicating the sequence of frame to use to unlock the device; and unlock the device when the user-indicated sequence of frame combinations matches the sequence of frame encoded in the passcode.

17. The at least one computer readable non-transitory storage medium of claim 15, wherein the instructions cause the machine to further:

prompt the user to retrieve a portion of the sensory association passcode when the user-indicated are non-matching frame combinations, the portion including any one or more of the sound and tactile patterns contained in each frame combination;

relay the portion of the sensory association passcode to the user after a successful alternative authentication, the portion of the sensory association facilitating user recall of matching frame combinations.

18. The at least one computer readable non-transitory storage medium of claim 15, wherein the visual item includes any one of an image, text or symbol capable of display on the user interface.

19. The at least one computer readable non-transitory storage medium of claim 15, wherein the user interface used for displaying the selection of frame is any one of a carousel interface, a tile interface or a dial interface, and further wherein the instructions cause the machine to, upon a user-selection of one of the frame combinations, present the content of the selected frame combination to the user, including displaying the visual item and any one or more of playing the sound clip and generating the tactile pattern with which the sensory association was created.

20. The at least one computer readable non-transitory storage medium of claim 15, wherein the content of each frame combination is user-selected in accordance with a security level, the security level higher when presenting the user with a wider selection of any one or more of the visual items, sound clips and tactile patterns and the security level lower when presenting the user with a narrower selection.

21. The at least one computer readable non-transitory storage medium of claim 15, wherein a number of frame encoded in the sensory association passcode is governed by a security level, the security level higher for encoding the sensory association passcode using a greater number of frame combinations and the security level lower for encoding the sensory association passcode using a smaller number of frame combinations.

* * * * *